United States Patent [19]

Conway

[11] 4,277,434
[45] Jul. 7, 1981

[54] INJECTION MOLDING RESILIENT RING CLIP

[76] Inventor: Gerald A. Conway, 3570 Warrensville Center Rd., Shaker Heights, Ohio 44122

[21] Appl. No.: 4,453

[22] Filed: Jan. 18, 1979

[51] Int. Cl.$^3$ ............................................. B29F 1/00
[52] U.S. Cl. ................... 264/297; 24/241 S; 24/255 SL; 24/237; 264/328.12
[58] Field of Search ................. 264/162, 297, 328.12; 24/237, 241 S, 255 SL

[56] References Cited

U.S. PATENT DOCUMENTS

| | | | |
|---|---|---|---|
| 1,209,083 | 12/1916 | Wagner | 24/241 S |
| 2,492,973 | 1/1950 | Dofsen | 264/297 |
| 2,510,091 | 6/1950 | Dofsen | 264/161 |
| 3,331,904 | 7/1967 | Friedman | 264/161 |
| 3,719,974 | 3/1973 | Abrams | 24/237 |
| 3,772,734 | 11/1973 | Kimel | 24/255 SL X |
| 4,033,143 | 7/1977 | Michael | 24/237 X |
| 4,128,918 | 12/1978 | Wenk | 24/255 SL X |

FOREIGN PATENT DOCUMENTS

| | | | |
|---|---|---|---|
| 58080 | 6/1905 | Fed. Rep. of Germany | 24/241 S |
| 1355720 | 12/1964 | France | 24/255 SL |

*Primary Examiner*—Thomas P. Pavelko
*Attorney, Agent, or Firm*—Maky, Renner, Otto & Boisselle

[57] ABSTRACT

The invention relates to a lightweight plastic ring clip useful as an inexpensive fastening and holding device and to a method of making such ring clips by injection molding. Each ring clip is molded into a solid shape which presents the appearance of a toroid with a small gap in it resulting from an incomplete revolution of the toroid-generating closed plane curve around the toroid-generating axis of rotation. The two ends of the ring clip, which define the small gap, are each flattened on a single side for a short distance along the ring in the area around and including the tips of the ring clip ends. The two flattened areas are on opposite sides of the ring and lie in planes parallel to each other and approximately normal to the toroid-generating axis of rotation. Projecting from and approximately normal to the flattened area of one of the ring clip ends, is an integrally formed pin which will fit snugly into a hole formed in the flattened area of the other ring clip end. The ring clip may be used to secure such items as drilled or perforated literature to wire baskets for display purposes or the like, by inserting such items into the small gap, inserting one of the ring clip ends through the drilled hole and forming a locked, closed ring by forcing the ring clip ends into an overlapping position and inserting the pin into the hole.

4 Claims, 8 Drawing Figures

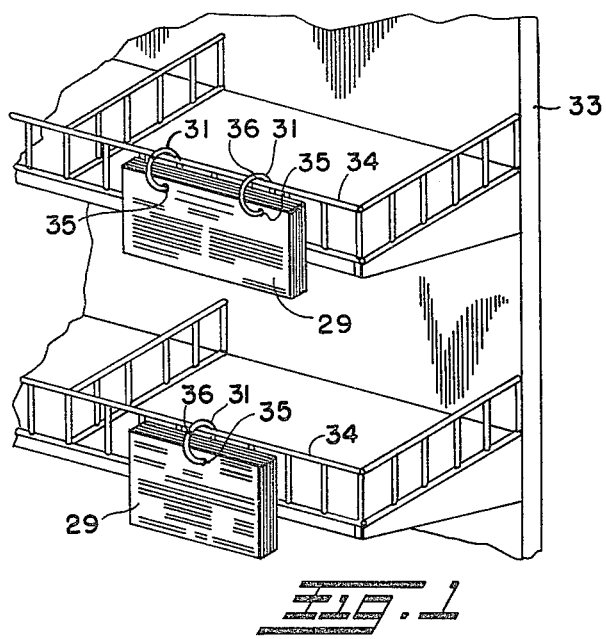
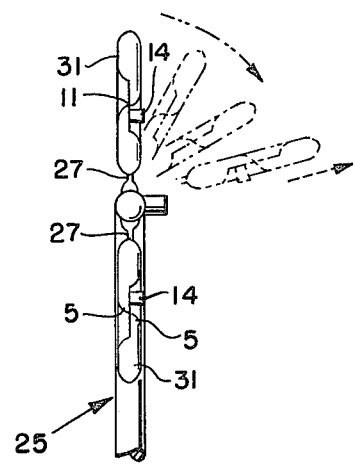
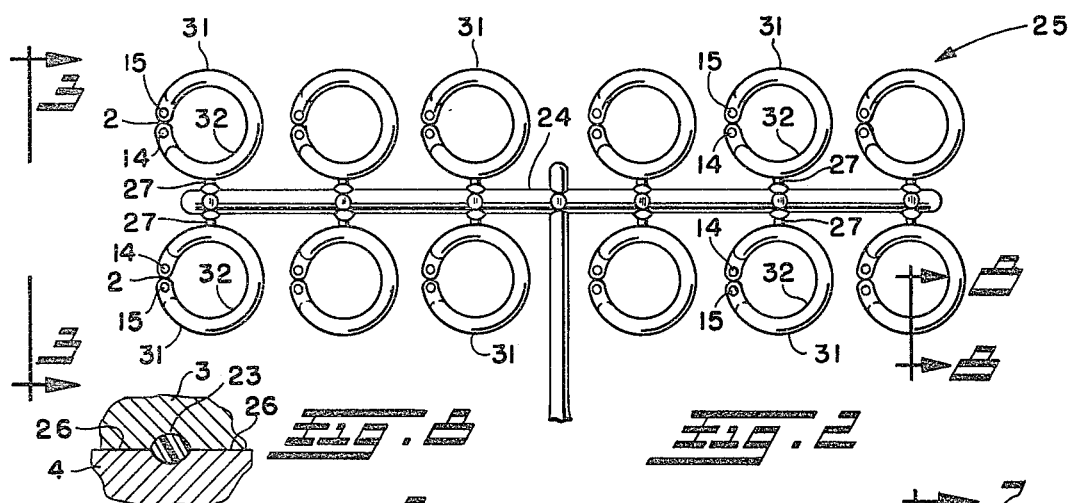
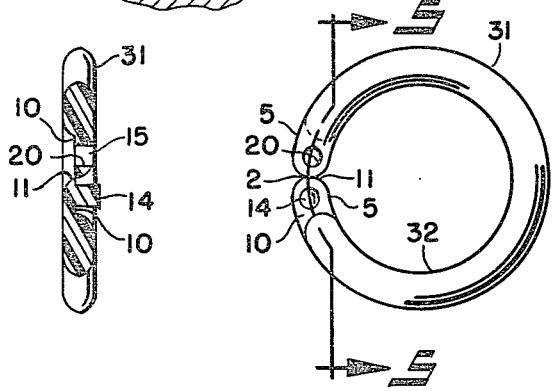

INJECTION MOLDING RESILIENT RING CLIP

BACKGROUND OF THE INVENTION

This invention relates to a ring clip, composed of a lightweight resilient material such as plastic, and to a method for producing a plurality of such ring clips, useful as an inexpensive fastener, holder or binding device. Such a device has many uses in retail stores, for example, in grocery, drug and discount stores, where, among other uses, it may be employed for holding printed messages or signs on wire baskets, shopping carts or any wire merchandiser.

Prior to the present invention an extruded coiled plastic ring has been used for the purposes referred to above. This ring was spiral in shape with a little more than a single turn of the spiral included, resulting in a ring fastener with discontinuities at the two ends of the coiled plastic. These ends make it difficult to neatly secure drilled literature, or for the ring fasteners to serve as notebook ringbinders since the ends frequently catch the material being secured. Also, with such coiled rings it is difficult for attached material to be moved freely relative to the ring fastener. Accordingly, a need for an inexpensive yet disposable ring fastener, which would be light in weight and allow material to be firmly secured and yet be freely and easily moved relative to the ring, is apparent.

Other plastic rings known have bulky means used to lock them in a closed position, and such rings are not necessarily circular in shape, both factors making it very difficult for secured materials to move freely with respect to the ring. Also, such rings have locking means which do not offer much resistance to forces applied to the interior of the ring, e.g., two objects secured by the ring with forces applied to them tending to make them move in opposite directions may easily pull certain types of such rings into an open or unlocked position.

SUMMARY OF THE INVENTION

It is the object of the present invention to provide a simple, easily manufactured, ring-shaped binding device.

It is also an object to provide a lightweight ring clip.

Another object is to provide an inexpensive ring clip.

A further object is to provide, in contrast with other ring fasteners, a ring clip which is easy to use.

Still another important object is to provide a resilient ring clip with a locking mechanism which resists radial, outwardly and oppositely directed, paired forces applied to the interior of, and acting in the same plane as, the ring clip, and where such resistance is greater than that provided by other ring fasteners of similar size, weight, and composition.

Yet another object is to provide a ring clip upon which secured materials can be freely and easily moved relative to the ring clip.

A further object is to provide a method of manufacturing a plurality of ring clips by injection molding.

Other objects and advantages of the present invention will become apparent as the following description proceeds.

To the accomplishment of the foregoing, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In the annexed drawings:

FIG. 1 is a fragmentary, perspective view of store shelving, showing the use of ring clips for securing drilled literature with one or more holes to such shelves;

FIG. 2 is a plan view of an injection molded, "T"-shape sprue assembly, complete with a plurality of attached ring clips;

FIG. 3 is an end elevation view, as seen from line 3—3 of FIG. 2, of a sprue assembly as shown in FIG. 2;

FIG. 4 is a top view of a ring clip in an unlocked position;

FIG. 5 is a sectional view taken along the line 5—5 of FIG. 4;

FIG. 6 is a top view of a ring clip in a locked position;

FIG. 7 is a sectional view taken along the line 7—7 of FIG. 6; and

FIG. 8 is a fragmentary, sectional view of a ring clip in a mold, showing a radial section of the ring clip as taken from the line 8—8 of FIG. 2.

DESCRIPTION OF THE PREFERRED EMBODIMENTS

Referring now to the embodiment illustrated in FIGS. 1-8 inclusive, the ring clip 31, as it comes from the mold in open-ended position, as seen in FIGS. 2-5 inclusive, has substantially the shape of a toroid generated by revolving a closed plane curve, which is approximately circular, around an axis lying in the same plane as, and not intersecting, the closed plane curve, where the toroid-generating closed plane curve is not fully revolved around the toroid-generating axis of rotation, leaving a small gap 2 between and defined by the ends 5 of the ring clip. The result is a ring clip which, when viewed from the toroid-generating axis of rotation, presents the appearance of an almost-closed-figure, circular letter "C". Such ring clip as seen in FIG. 8 when viewed along the line 8—8 of FIG. 2, has a cross-sectional area with a shape like the area of intersection of two equi-radial non-concentric, overlapping circles.

The ring clip can be made by utilizing other toroid-generating closed plane curves, such as a square, or triangle, thus giving the ring clip the corresponding cross-sectional shapes, when seen along line 8—8 of FIG. 2, of a square or a triangle, respectively.

A somewhat resilient material, such as a lightweight plastic, can be used in the manufacture of the ring clips. Polypropylene has been found to be satisfactory and is preferred. Other conventional injection molding compounds may be used.

In order to make it possible for the ring clip to secure various objects and materials, locking means are located on the ring clip ends by which the ring clip ends can be locked in a circumferential overlapping position, as in FIGS. 1, 6 and 7, in which position the ring clip presents, when viewed from the toroid-generating axis of rotation, a slightly egg-shaped, closed figure, as in FIG. 6.

The locking means is comprised of: a flattened area 10, along a single opposed side of the end of each ring clip where such flattened areas extend for a short distance from the tips 11 of such ends, and where the flattened areas are on opposite sides of the ring and lie in parallel planes which are approximately normal to the toroid-generating axis of rotation; a pin 14 projecting from and approximately normal to the flattened area of one of the ring clip ends; and a hole 15, the longitudinal axis of which is parallel to the longitudinal axis of the pin, and which is formed in the flattened area of the other ring clip end.

The ring clip ends may, with the application of a small amount of force, be brought into overlapping positions such that the flattened areas are facing each other and the pin lines up with the hole, into which it may be snugly fit, bringing the flattened areas into substantial facing contact with each other as shown in FIG. 7.

After the pin has been inserted into the hole, the ring clip is in a locked, slightly deformed egg-shape position. In this position the ring clip exerts a restoring force, tending to restore the ring clip to its original, unlocked and open ended circular shape, which causes the wall 20 of the hole to exert a slight shearing force upon the pin, generating a frictional force which resists forces tending to pull the pin from the hole and unlock the ring clip.

The ring clip, in its locked position as shown in FIG. 6, will resist substantial, paired forces shown by the arrows 30, oppositely directed and acting in the plane of the ring clip against the inner surface 32 of the ring clip, as shown in FIG. 6.

The invention also relates to a method whereby a plurality of ring clips are manufactured by injection molding, a well known process as applied to other articles of manufacture, where each ring clip is of single piece construction, and composed of a plastic, such as the aforementioned polypropylene.

The molds are made so that a plurality of ring clips come from the mold secured to a sprue 24, as illustrated in FIG. 2, by attaching means 27 comprising a thin, narrow, short piece of the same material of which the ring clips and sprue 24 are composed, all of which, when the injection cycle and partial curing are completed, comprise a unitary sprue assembly 25, all the components of which are coplanar. The sprue assembly 25 is molded between a half 3 and a half 4 of the mold, which halves come together forming a sealed interface 26. This is illustrated in FIG. 8 where a radial section 23 of a ring clip, as seen along line 8—8 of FIG. 2, is shown in position between the mold halves 3 and 4, where such halves are in firm contact, forming said sealed interface 26. The ring clips may be removed from the sprue 24 by twisting them relative to the sprue to break the short sprue attaching means 27, as shown in FIG. 3.

The ring clip may be used to secure drilled or perforated literature 29 to shelving 33, or the like, as shown in FIG. 1, by spreading the ends of the ring clip and inserting one of the ends into the drilled hole 35 in the literature, passing one of the wires of the shelf edging 34 between the spread ends into the interior of the ring clip, and finally by locking the ends together. The plastic material has sufficient memory to retain its planar locked configuration as seen in FIG. 6, when forced from the open to the closed and locked position.

In order that such drilled literature move freely upon the ring clip, the locking means area 36 of the ring clip is substantially of the same circumference and shape as the rest of the ring clip, so that, if the line 8—8 on FIG. 2 was through the locking means area, the cross-sectional view for most of that area would be substantially the same as the view in FIG. 8. In this manner the secured material is able to move freely without binding or getting hung-up on bulges or projections on the ring clip.

It will, of course, be appreciated that the ring clip may be subjected to secondary finishing operations such as grinding or tumbling to remove the remnant of the attaching means 27 or any excess projection of the pin 14.

In addition to holding drilled literature, the ring clip, among many other uses, may be used as a display holder, a fastener to hold mobile panels together, a ring binder or a key ring, for example.

Other modes of applying the principal of the invention may be employed, change being made as regards to the details described, provided the features stated in any of the following claims or the equivalent of such be employed.

The embodiments of the invention in which an exclusive property or privilege is claimed are defined as follows:

1. A method of producing resilient ring clips comprising the steps of: providing a two-part injection mold having therein, when closed, a substantially toroidal shape cavity for forming an open-ended ring clip that has a small gap between the ends thereof resulting from incomplete revolution of the toroid-generating closed plane curve around the toroid-generating axis of rotation, such cavity further being shaped to provide a flattened area extending along a side of each of the ends of the ring clip for a short distance from the tip of each end which flattened areas are on axially opposite sides of the ring clip and approximately normal to the axis, a hole in the flattened area of one of the ends, and a pin projecting from and approximately normal to the flattened area of the other of the ends, which pin fits snugly into the hole when the two ends are brought into overlapping relationship and the two flattened areas into substantial, facing contact, and such cavity further being shaped such that the ring clip when thusly closed is of substantially uniform cross-sectional shape; assembling and closing the mold parts along a parting face lying in the plane of the ring clip shape cavity; injecting material into the cavity in the closed mold to form the ring clip; and then opening the mold and removing the ring clip therefrom.

2. The method according to claim 1 wherein said step of injecting material includes selecting a plastic material that, when cured, is resilient and has memory tending to restore the clip when deformed to its original shape, whereby the ring clip when closed generates a slight frictional force between the pin and hole for holding the ends of the clip against separation.

3. The method of claims 1 or 2 wherein said step of providing includes providing a two-part mold having a plurality of such ring clip shape cavities therein and a single sprue cavity interconnecting such ring clip shape cavities, whereby a plurality of the ring clips will be attached to a single sprue from which the ring clips may be detached.

4. The method of claim 3 wherein the ring clip shape cavities and sprue cavity all lie in the same plane.

* * * * *